(12) United States Patent
Morita

(10) Patent No.: US 11,947,847 B2
(45) Date of Patent: Apr. 2, 2024

(54) APPLICATION FOR ACQUIRING AND DISPLAYING PROCESSING STATUS OF PRINT DATA

(71) Applicant: CANON KABUSHIKI KAISHA, Tokyo (JP)

(72) Inventor: Keisuke Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/162,248

(22) Filed: Jan. 31, 2023

(65) Prior Publication Data

US 2023/0176799 A1 Jun. 8, 2023

Related U.S. Application Data

(63) Continuation of application No. 17/511,005, filed on Oct. 26, 2021, now Pat. No. 11,586,401.

(30) Foreign Application Priority Data

Oct. 30, 2020 (JP) .................................. 2020-183171

(51) Int. Cl.
*G06F 3/12* (2006.01)
*H04N 1/00* (2006.01)

(52) U.S. Cl.
CPC .......... *G06F 3/1229* (2013.01); *G06F 3/1207* (2013.01); *G06F 3/1253* (2013.01); *G06F 3/1292* (2013.01); *H04N 1/00472* (2013.01); *H04N 1/00477* (2013.01)

(58) Field of Classification Search
CPC .... G06F 3/1229; G06F 3/1207; G06F 3/1253; G06F 3/1292; H04N 1/00472; H04N 1/00477
See application file for complete search history.

(56) References Cited

U.S. PATENT DOCUMENTS

| 2011/0194140 A1* | 8/2011 | Sweet | G06F 3/1204 358/1.15 |
| 2012/0050795 A1* | 3/2012 | Nakamura | G06F 3/1287 358/1.15 |
| 2021/0026574 A1* | 1/2021 | Kato | G06F 3/1232 |

* cited by examiner

*Primary Examiner* — Iriana Cruz
(74) *Attorney, Agent, or Firm* — Canon U.S.A., Inc. IP Division

(57) ABSTRACT

By using the present disclosure, for example, a notification of an error that has occurred in a device can be received even in cloud printing. Some embodiments provide a method performed by executing an application using an information processing apparatus that transmits print data to be transferred to a printing apparatus by a server system, the method including transmitting, to the server system, a request to check a processing status of the print data in the printing apparatus, receiving the processing status of the print data from the server system having responded to the request, and displaying the received processing status on a display unit of the information processing apparatus.

23 Claims, 17 Drawing Sheets

FIG. 4

| USERNAME | PASSWORD | GROUP INFORMATION | TERMINAL INFORMATION (MAC ADDRESS) | ACCESS DESTINATION (IP ADDRESS) |
|---|---|---|---|---|
| user01 | ****** | Group001 | 12:34:56:78:9a | 123.111.222.001 |
| user01 | ****** | Group001 | 11:22:33:44:55 | 123.111.222.002 |
| user02 | ****** | Group001 | 24:68:10:12:14 | 123.111.222.003 |
| .. | .. | .. | .. | .. |

FIG. 8

| PRIORITY LEVEL |
| --- |
| NUMBER OF COPIES |
| PRINT SETTINGS |
| PRINT CONTENT |
| ATTRIBUTE PARAMETERS |
| : |

FIG. 9

| OPERATIONAL ATTRIBUTE | STATE CODE |
| --- | --- |
| | LANGUAGE CODE |
| JOB OBJECT ATTRIBUTE | ID |
| | STATE |
| | STATE MESSAGE |
| EXTENDED ATTRIBUTE (MANAGEMENT INFORMATION) | GROUP INFORMATION |
| | TERMINAL INFORMATION |
| | ACCESS DESTINATION |
| EXTENDED ATTRIBUTE (NOTIFICATION INFORMATION) | INFORMATION TYPE |
| | NOTIFICATION MESSAGE |
| | NOTIFICATION DESTINATION |
| | NOTIFICATION RANGE |

FIG. 11

| DEVICE NAME | HWID | CONNECTION PORT (IP ADDRESS) |
|---|---|---|
| Virtual Printer | VP_XXXX1212 | 10.20.30.45 |
| iR-ADV 1111 | iR-ADV_AAAA0110 | 100.200.30.001 |
| iR-ADV 2222 | iR-ADV_BBBB1A2B | 100.200.30.002 |
| Test Printer | TP_ZZZZOP9R | 123.111.222.100 |
| : | : | : |

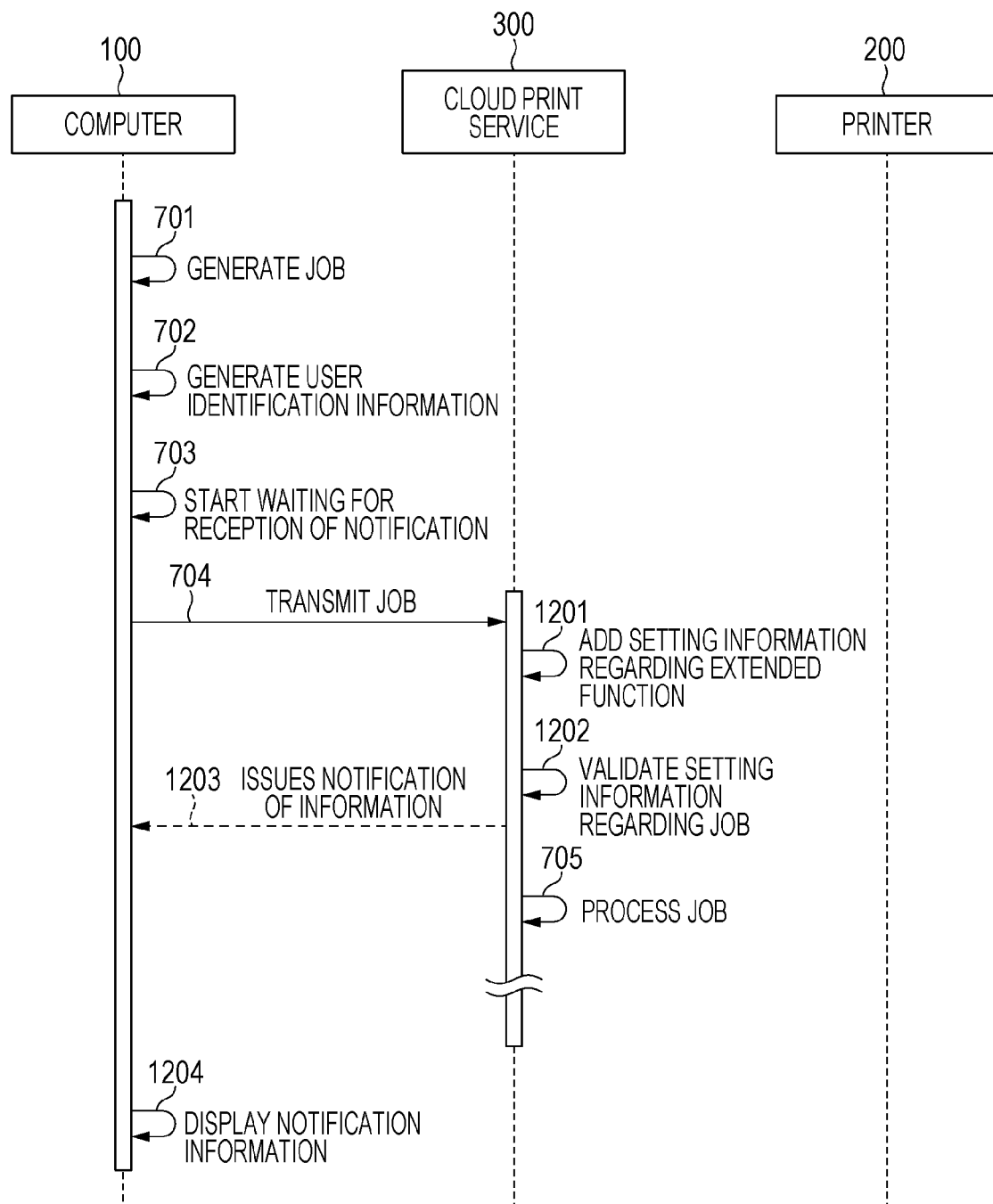

FIG. 15

| ATTRIBUTE | SETTING VALUE |
|---|---|
| printer-state | Stopped |
| printer-state-reasons | Ink/Toner Empty |
| printer-state-message | Ink/Toner is running out. |
| . . . | |
| toner-level-red | 0 |
| toner-level-cyan | 0 |
| toner-level-magenta | 80 |

Rows 1–3: 1501
Rows 5–7: 1502

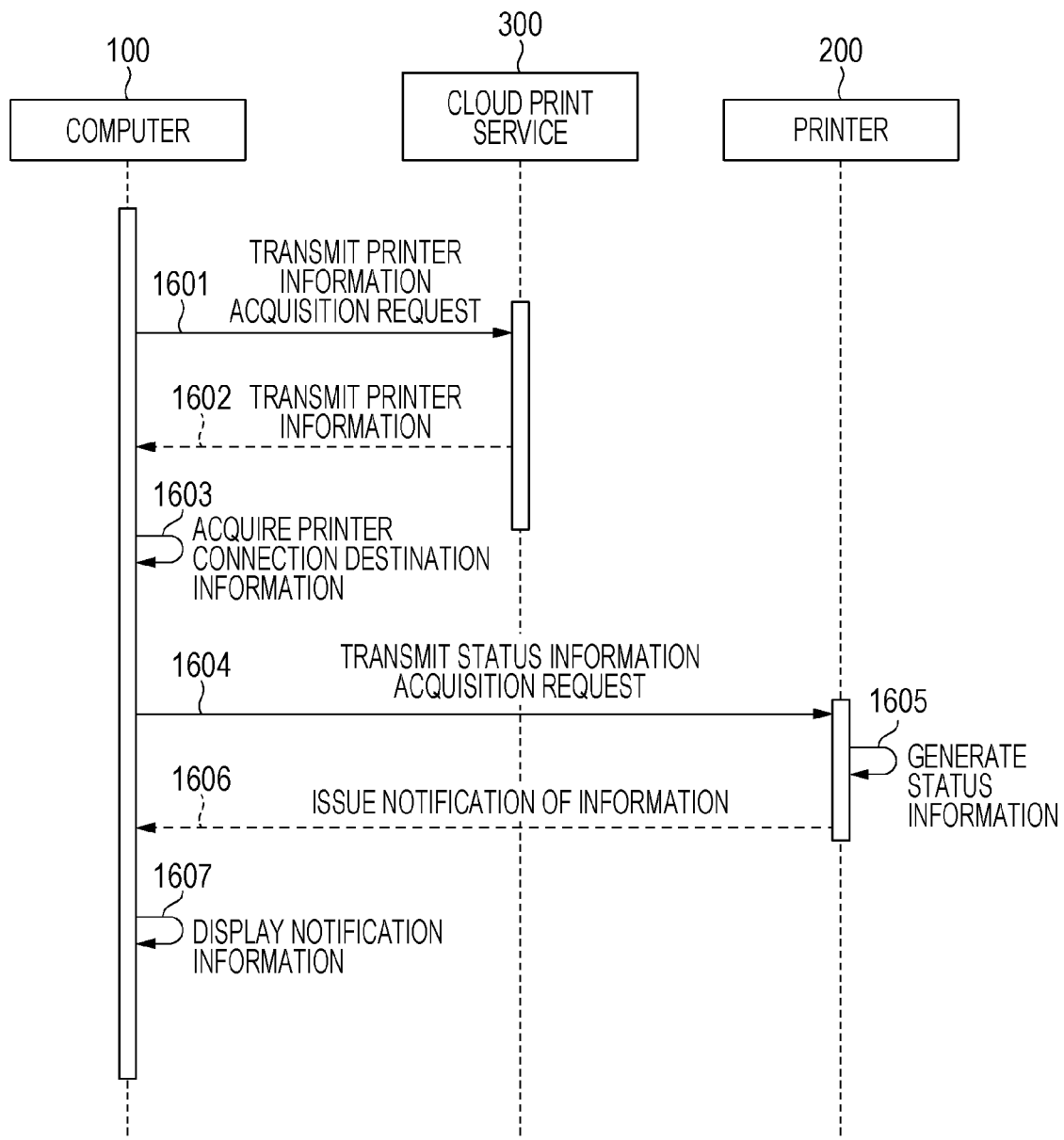

APPLICATION FOR ACQUIRING AND DISPLAYING PROCESSING STATUS OF PRINT DATA

CROSS-REFERENCE TO RELATED APPLICATIONS

This application is a Continuation of U.S. patent application Ser. No. 17/511,005, filed Oct. 26, 2021, which claims the benefit of Japanese Patent Application No. 2020-183171, filed Oct. 30, 2020, both of which are hereby incorporated by reference herein in their entirety.

BACKGROUND

Field of the Disclosure

The present disclosure relates to a recording medium and an information processing apparatus in which an application that acquires and displays print status is stored and to a method regarding the application.

Description of the Related Art

Cloud printing such as Google Cloud Print is known (Japanese Patent Laid-Open No. 2013-238924). In forms of such cloud printing, there is no known system for providing the print status of an image forming apparatus to a user.

SUMMARY

An exemplary embodiment of the present disclosure is a method performed by executing an application using an information processing apparatus that transmits print data to be transferred to a printing apparatus by a server system, the method including: transmitting, to the server system, a request to check a processing status of the print data in the printing apparatus, receiving the processing status of the print data from the server system having responded to the request, and displaying the received processing status on a display unit of the information processing apparatus. The other exemplary embodiments will be apparent from the specification.

Further features of the present disclosure will become apparent from the following description of exemplary embodiments with reference to the attached drawings.

BRIEF DESCRIPTION OF THE DRAWINGS

FIG. 4 illustrates management information regarding user notification destinations.

FIG. 8 illustrates an example of data of a print job.

FIG. 9 illustrates an example of attribute parameters of the print job.

FIG. 11 illustrates an example of printer internal information.

FIG. 12 is a sequence diagram in which a notification of an event that has occurred on the cloud print service is issued.

FIG. 15 illustrates an example of the printer status information.

FIG. 16 is a sequence diagram of processing in which the print extensibility app directly communicates with the printer to acquire status information.

DESCRIPTION OF THE EMBODIMENTS

In the following, exemplary embodiments for executing the present disclosure will be described using the drawings.

Exemplary Embodiment 1

Figure 1:
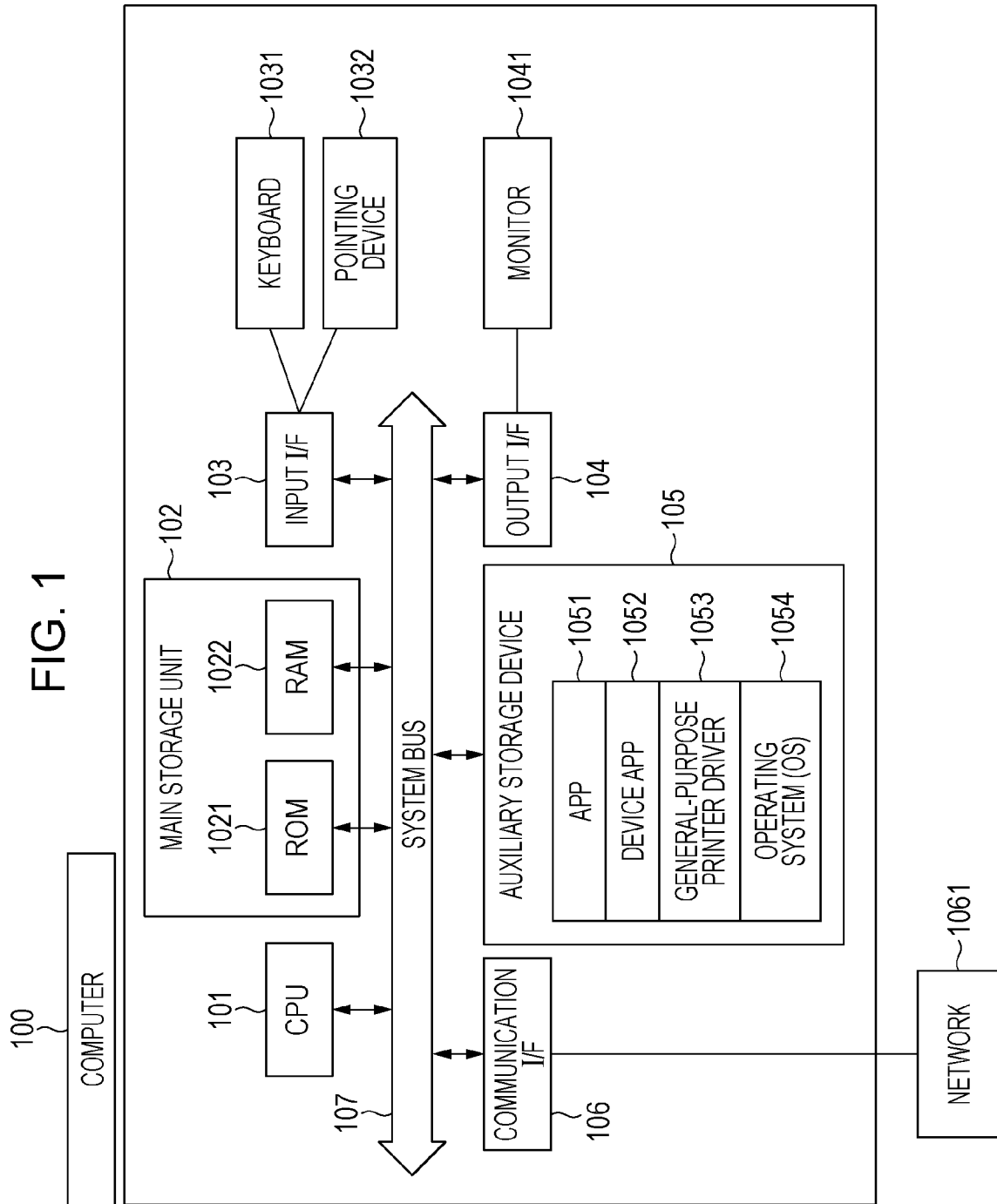
FIG. 1 is a block diagram of the hardware and software configuration of a computer system.

FIG. 1 is a block diagram of the configuration of a system using a general computer (an information processing apparatus) and illustrates an exemplary embodiment of the present disclosure. A central processing unit (CPU) 101 controls the entirety of a computer 100 in accordance with a program stored in a read-only memory (ROM) 1021 or a random-access memory (RAM) 1022 of a main storage unit 102 or an auxiliary storage device 105. The RAM 1022 is also used as a work area when the CPU 101 performs individual processes. In the auxiliary storage device 105, various programs such as an application (app) 1051, a device application (a device app) 1052, a general-purpose printer driver 1053, and an operating system (OS) 1054 are stored. Input devices such as a keyboard 1031 and a pointing device 1032 are connected to the computer 100 through an input interface (I/F) 103. Representative examples of the pointing device 1032 include a mouse, a touch panel, and a touch pad. Operations to the programs from the user are accepted through these input devices. An output device such as a monitor 1041 is connected to an output I/F 104, and a user interface (UI) is displayed on the monitor in accordance with a command from the program. Note that terminals including a smartphone and a tablet terminal may also include a device integrally formed by the pointing device 1032 and the monitor 1041. In this case, the pointing device 1032 and the monitor 1041 are simply denoted in a separate manner on a function basis, and the integrally formed device can thus be used instead as a matter of course. A communication I/F 106 is connected to a network 1061 and can communicate with external devices of the computer 100 such as a computer 1001, a computer 1002, and a printer (an image forming apparatus) 202 in FIG. 2. The modules described above are connected by a system bus 107, and data can be exchanged between the modules. Apps 1051 to 1054, in which processing according to the present disclosure is included, can be added into the auxiliary storage device 105 via a CD-ROM or a USB memory, which is not illustrated. Furthermore, the apps 1051 to 1054 can be added into the auxiliary storage device 105 also via the network 1061. Needless to say, unless otherwise specified, the present disclosure can be applied regardless of the configuration of devices as long as the functions of the present disclosure are executable. The present disclosure may be applied to a discrete device, a system composed of a plurality of devices, or a system in which connection is established through a local network to perform processing.

Figure 2:
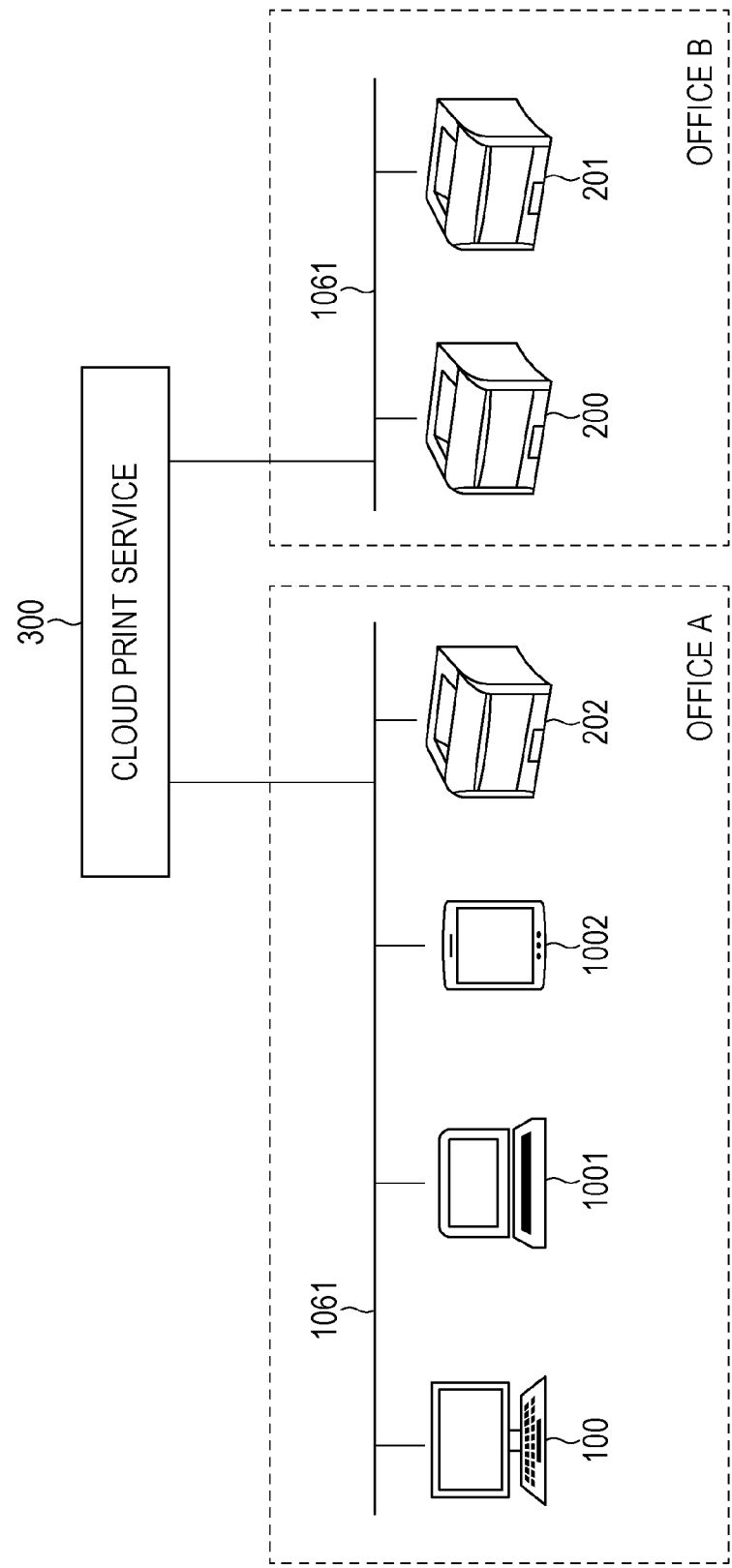
FIG. 2 is a diagram of the configuration of a communication environment in which clients and printers are connected to each other.

FIG. 2 is a schematic diagram illustrating the environment of the network 1061 in the first exemplary embodiment of the present disclosure. Computers 100, 1001, and 1002, which generate a document or an image to be printed, are connected to a single network or a plurality of networks. Furthermore, a printer 202 may be connected to a single network or a plurality of networks or may also be connected to the computer 100, 1001, or 1002 via a USB interface. In addition, the computer 100 is connected to a cloud print service 300 on the network and can also communicate with a printer 200 and a printer 201 placed under the control of another network through the cloud print service 300. Networks include a small-scale network such as a personal area network (PAN) or a local area network (LAN) and a large-scale network, and these devices are connected to all the networks. Note that a server and a printer may be connected to each other via the Internet such as the cloud. A communication method in this case is not limited. For example, communication using a wireless LAN supporting IEEE 802.11 standards or Bluetooth® communication is conceivable. Alternatively, communication through mobile telephone lines supporting International Mobile Telecommunications-2000 (IMT-2000) standards is also conceivable. Alternatively, regarding USB communication, communication may be relayed using, for example, a USB hub or a switching device other than communication through direct USB connection.

Figure 3:
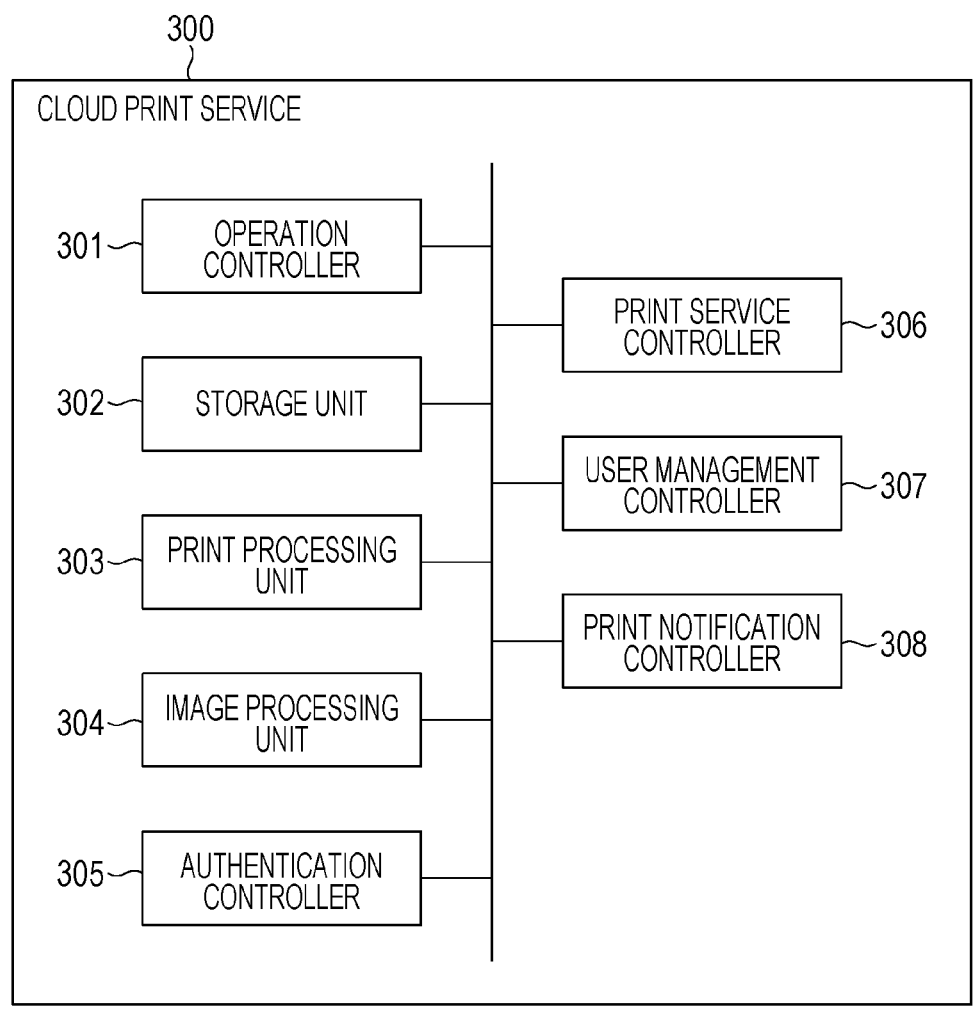
FIG. 3 is a diagram of the configuration of a cloud print service.

FIG. 3 is a diagram of the configuration of server systems, which are the cloud print service 300, on the network. The cloud print service 300 is an Internet cloud print service constructed on a plurality of server systems. In the present exemplary embodiment, the cloud print service 300 can be connected to respective intranets and is connected to the computer 100 or the printer 200 through the Internet. The cloud print service 300 manages accounts using IDs (user identification information) and passwords, and a user can access the cloud print service 300 using his or her account. An account under user management may be associated with the login user of the OS 1054. In a case where, for example, the app 1051 performs login authentication separately and the user has an authentication token for login, the user does not have to input the ID and the password additionally.

FIG. 3 is a diagram of the configuration of the cloud print service 300. The cloud print service 300 is a service present on the cloud through the Internet and can provide functions related to printing. In the present exemplary embodiment, the cloud print service 300 has an operation controller 301, a storage unit 302, a print processing unit 303, an image processing unit 304, an authentication controller 305, a print service controller 306, a user management controller 307, and a print notification controller 308. These functions may be provided from another cloud print service that works in association with the cloud print service 300. In the following, description will be made using the printer 200 as an example. The cloud print service 300 can be realized by performing substantially the same processing even in the case where the printer 201 or the printer 202 is used, which can be connected to the cloud print service 300.

In this case, the operation controller 301 displays an operation screen that can directly access a cloud environment or displays an operation menu through a Web browser or an application corresponding to the cloud print service 300. The operation controller 301 waits for a command from the user, and transfers the content of the command to other controllers, the command being input by the user.

The storage unit 302 stores specified data in or reads out stored data from a storage area managed on the cloud, in accordance with a command from another controller. Examples of data managed by the storage unit 302 include print data such as a print job, user account information, and authentication information indicating that the user has logged into the cloud print service 300.

The print processing unit 303 performs validation processing (Validate) on the print settings of a print job, converts content data of a print target into data in a format that individual environments and individual printers can interpret, and transfers the data.

The image processing unit 304 performs processing in which a rendering is performed on image data or intermediate data for printing a print job.

The authentication controller 305 performs, for example, authentication using an ID and a password, login control using Cookie on a browser, or authentication processing using an authentication token on an application. Any method is acceptable as long as the method uses a system that allows sharing of a login session such as single sign-on.

The print service controller 306 interprets a print request received from the computer 100, stores a print job together with management data representing the date and time of reception of the print job and the name of the user having sent the print request, transmits the print job to the printer 200, and performs processing for receiving a notification regarding the print job.

The user management controller 307 handles information for managing users. For example, in the present exemplary embodiment, as illustrated in FIG. 4, the user management controller 307 handles usernames authentication of which is being performed and information regarding connection devices. In this case, the usernames are user IDs used in login authentication. Note that, in the case of a guest account, a temporarily allocated ID, a shared ID, or information allocated in default processing such as "Unknown" may be used. Password is described as a pass phrase for performing user authentication; however, there is no problem using pattern authentication in which authentication is performed by moving the mouse or performing a touch operation along the display surface, image authentication, biometric authentication, or data or a link corresponding to authentication token information regarding a target app. Group information corresponds to, for example, information regarding the company or department to which a user belongs. Terminal information is information used to specify a terminal from which the user makes access. In the present exemplary embodiment, as one example, the MAC address of a network card that the terminal uses to establish a connection is taken as an example. Any other information is acceptable as long as the information uniquely identifies the terminal. Examples of the information include the volume serial number of a hard disk, the ID value if obtainable from an OS, and SIM information or the terminal serial number if the terminal is a mobile terminal. Moreover, in the case of iOS, identification information such as identifierForVendor (IDFV) or the advertisingIdentifier may be used. Information on access destinations represent IP addresses in the present exemplary embodiment; however, any information such as a link or a Uniform Resource Identifier (URI) is acceptable as long as the information enables access to a specific terminal.

The print notification controller 308 performs processing for issuing a notification regarding printing. The print notification controller 308 also holds information regarding a communication terminal that allows reception of a notification. Examples of the information include a user ID, authentication information, the hardware ID (HWID) of the printer that is to perform printing, the IP address of the user terminal, and application information, which are involved in the printing.

Figure 5:
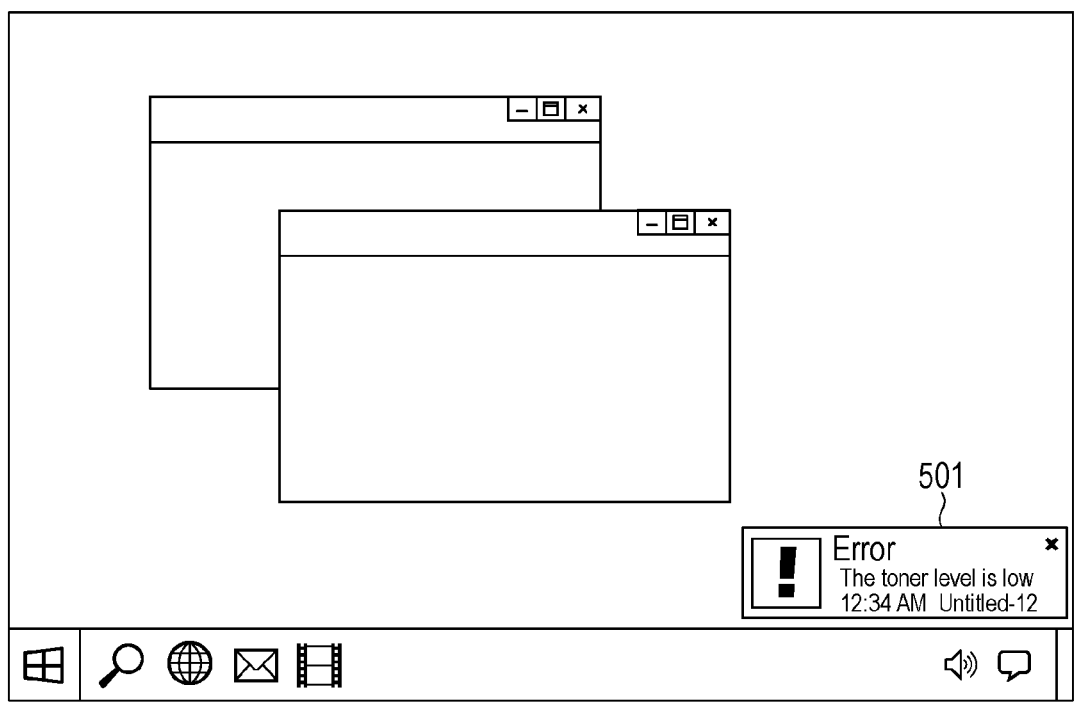
FIG. 5 illustrates an example of display of a notification on a computer.

In the present exemplary embodiment, the computer 100 causes the printer 200 to perform printing through the cloud print service 300. Furthermore, the computer 100 receives, from the cloud print service 300, a notification event that has occurred in the printer 200 such as an error, and performs processing for displaying a screen notification 501 in FIG. 5.

Figure 6:
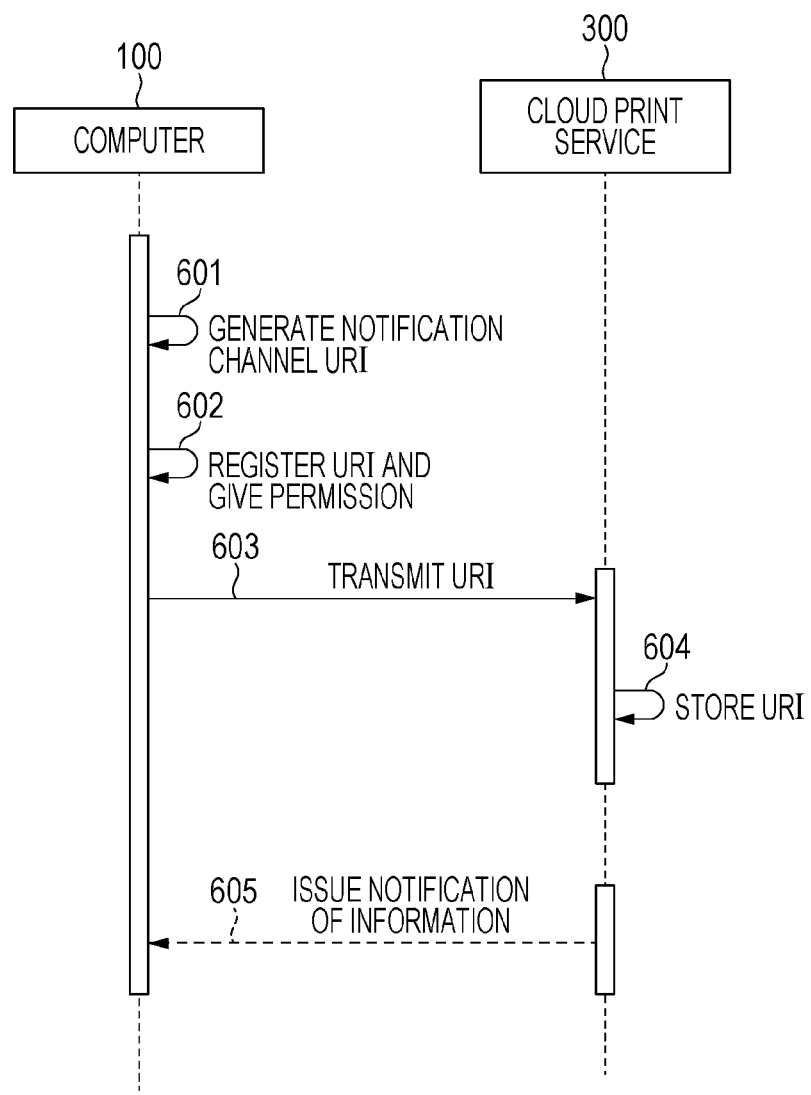
FIG. 6 is a sequence diagram of registration processing regarding a notification by the cloud print service to a client.

In this case, when the computer 100, which is a client, displays a notification, there may be a case where a communication from an unknown connection site, which is the cloud print service 300, is not allowed by default in terms of security. Thus, in order to enable reception of a notification, FIG. 6 is a sequence diagram in which the computer 100, which is a client, is registered in the cloud print service 300, so that the computer 100 can receive a notification of information. Note that in a case where the OS 1054 is originally designed to receive a notification from the cloud print service 300, the sequence does not always have to be performed. In a case where a notification is received using a browser function, for example, a method for "launching a browser and completing a login" may be used rather than waiting for reception of a notification.

First, the computer 100 generates a URI of a notification channel (601). For example, the URI is http://user01@test.pc.com:8080/SampleService, which enables access to the computer 100, which is a client.

Next, the generated URI is registered in the computer 100 (602). In this case, when notification permission needs to be given to an application or a service used for notification, the notification permission is also given. Note that in a case where, for example, a confirmation setting is set such that the user is asked whether to permit a notification when the notification is made, the notification permission may be given at a timing that is freely chosen.

The registered URI is transmitted from the computer 100 to the cloud print service 300 (603). The URI is also stored and registered in the cloud print service 300 (604). A channel for communication is established through these operations.

Thereafter, the computer 100 receives, at a timing that is freely chosen, a notification of information issued from the cloud print service 300 to the computer 100 (605).

Figure 7:
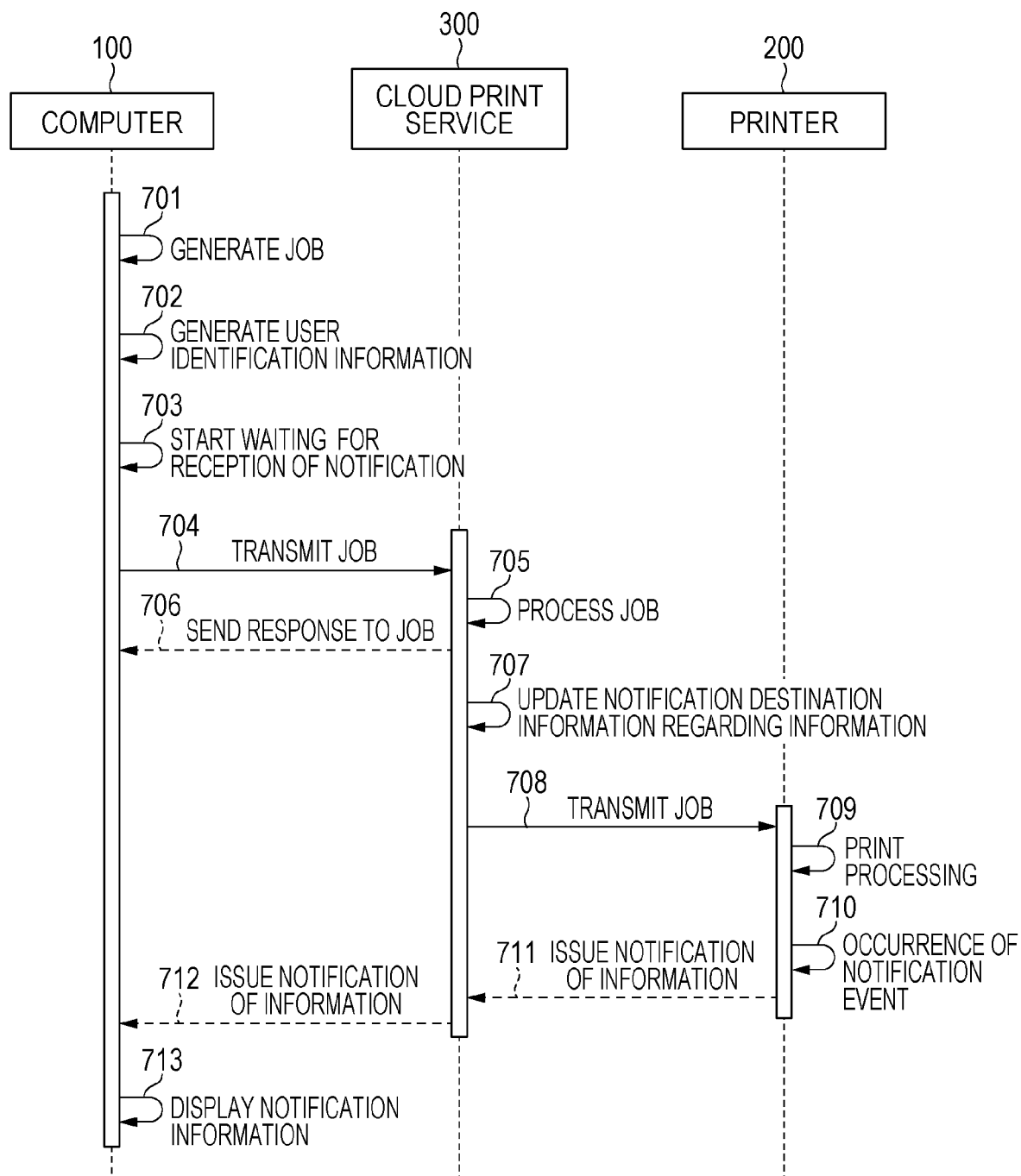
FIG. 7 is a sequence diagram of information notification processing at the time of printing.

FIG. 7 is a sequence diagram representing processing in which the computer 100 receives a notification of information at the time of printing.

First, here, an example of data included in a print job will be described using FIG. 8. First, "priority level" refers to priority level for job scheduling. In this case, for example, the order in which jobs are to be printed is controlled by setting the priority level of each job to a value out of 1 to 100 when the highest priority level corresponds to 100. Note that details of the control are not specified as long as the control is performed under appropriate rules such that, for example, "a priority level higher than given levels is not given". "Number of copies" refers to the number of copies of the print job. "Print settings" refers to settings necessary for printing. Examples stored as the settings include color or two-sided specification, medium information, finishing information, print quality, and image quality information such as resolution. These settings may be structured text data including XML-based data such as XPS or PrintTicket or binary print setting data such as Devmode. "Print content" may be any data that is interpretable at a transfer destination and may thus be data unique to the vendor. Examples of such data include page description language (PDL) data such as XPS or PDF, simple text data, simple image data, and data including a reference to document data. Aside from data directly necessary for printing, "attribute parameters" refers to parameters for performing various processes at the time of printing. Attribute parameters will be described using FIG. 9. The attribute parameters are sent by being added together with print data to a print job. In the first exemplary embodiment, the attribute parameters of the job include parameters related to "operational attribute" and parameters related to "job object attribute". In the first exemplary embodiment, in particular, "extended attribute" is also additionally defined. A state code of the operational attribute is used in the entire processing. Examples of the state code include "successful" indicating that an operation has been successfully performed, "redirection" indicating that a further operation needs to be performed, "client-error" indicating that the job is not executable, and "server-error" indicating that a request that seems valid has not been successfully performed. A language code of the operational attribute refers to a language or a character code used in communication. The ID of the job object attribute is used to uniquely identify the job using a numeric value or a globally unique identifier (GUID). A state of the job object attribute refers to the state of an object. Some specific examples include "pending" indicating that the object has not yet been processed, "processing" indicating that the object is being processed, "processing-stopped" indicating that processing of the object is being suspended but will be restarted as soon as a cause is eliminated, and "canceled" indicating that the object is canceled through Cancel-Job operation or the like. Furthermore, the examples include "abort" indicating that the job ends due to an abnormality of the system and "completed" indicating that the job has been successfully performed. A state message of the job object attribute is used to describe the content of a message in a region into which text data can be freely written.

Next, extended attributes are related to message notification used in the first exemplary embodiment. "Extended attribute (management information)" corresponds to the computer 100, which is a client of which a message is notified. Each parameter of "extended attribute (management information)" has already been described in the example in FIG. 4, and thus details will be omitted. In the following, parameters of "extended attribute (notification information)" will be described in a supplemental manner. "Information type" indicates the type of information. Examples of "information type" include "error", "warning", and "information". "Notification message" corresponds to text data of the content of a notification. "Notification destination" corresponds to information for specifying a notification destination. Examples of "notification destination" include "username" used in a case where a user is specified, "group information" used in a case where a group is specified, and "access destination" such as an IP address used in a case where a terminal is specified. "Notification range" specifies a range to which a notification is to be issued. Examples of "notification range" include "terminal", "user", "group", and "all terminals". For example, by specifying that "notification range" is "user" and that "notification destination" is "user01", it is specified that a message is to be sent to two terminals from the top and managed by "user01" in the case of FIG. 4. Alternatively, by specifying that "notification range" is "group" and that "notification destination" is "Group001", it is specified that a notification is to be sent to all the logged-in terminals in the organization corresponding to "Group001".

Figure 10:
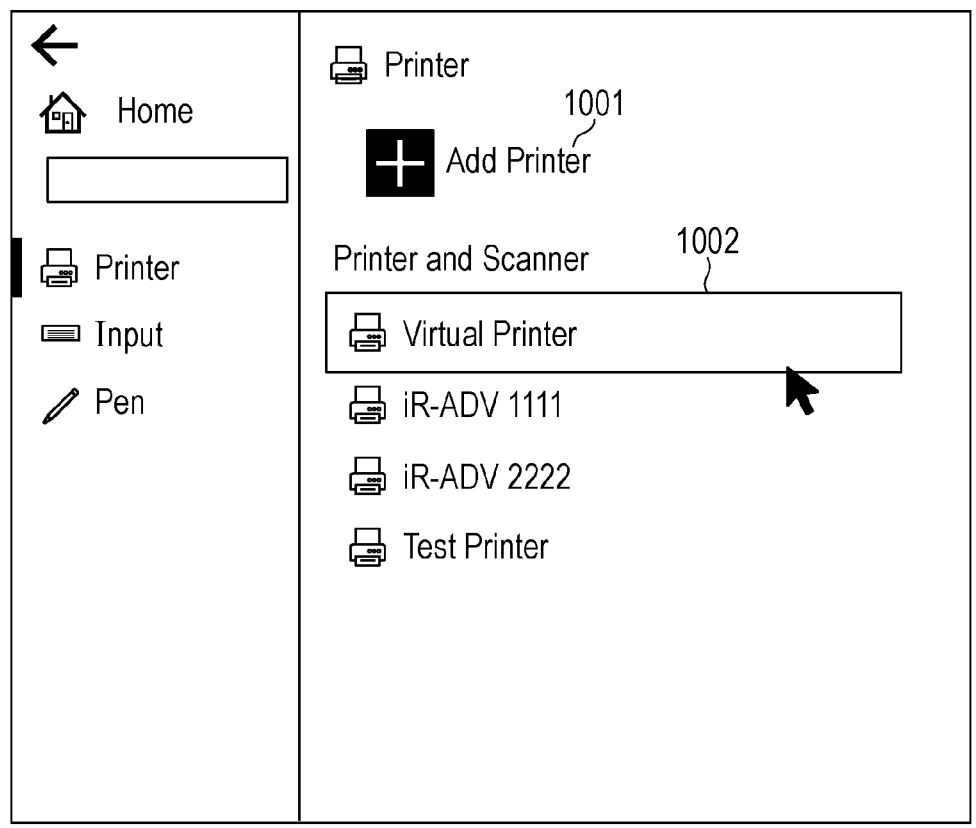
FIG. 10 illustrates a screen displaying installed printers.

First, a job is generated to perform printing from the computer 100 (701). In this case, processing is performed to convert print target data and print setting information needed for printing such as "two-sided" and "color" into intermediate data or data that the cloud print service 300, which is a transmission destination, can interpret. The conversion result is called a job. In this case, a virtual printer of the cloud print service 300 is specified as a target printer. This virtual printer is one of print functions provided by the cloud print service 300. After logging in the cloud environment, as in the case of normal printers, the user can search for and add the virtual printer similarly from a printer addition button 1001 in FIG. 10 through a service system such as Active Directory. As in the case of other printers as in FIG. 11, the virtual printer has "HWID", which is an ID unique to the printer, or "connection port" information regarding the printer in addition to "device name". Note that, as the "connection port" information in the present exemplary embodiment, an IP address is specified; however, a WSD port such as "WSD-12345678-abcd-efgh-ab1234567890" may be specified. Moreover, the address of a connection destination may be the address of the cloud system itself or may also be a virtually allocated address. From the OS or an application of the computer, the virtual printer is seen as in the form of a virtual printer 1002 in FIG. 10, the form being the same as that of a regular physical printer, and printing is performed by sending a print job to the virtual printer as in the case of a regular printer. In the present exemplary embodiment, a job is transmitted to the printer 200 by performing print processing for the virtual printer 1002 (that is, transmitting the job to the virtual printer 1002). However, there is another method in which the cloud print service 300 temporarily stores a print job and printing is performed at another timing. In a case where this method is used, the user logs on to the cloud print service 300, which provides the virtual printer of the printer 200, using for example a browser to display his or her print jobs, selects a print job that the user wants to print from among the displayed print jobs, and commands printing.

In step 702, user identification information is generated. This user identification information corresponds to information to be attached to a print job and used by the user management controller 307 of the cloud print service 300 such as group information and terminal information in FIG. 4. In this case, information such as "username", "password", and "group information" are obtained by making an inquiry to the cloud print service 300 on the basis of information registered at the time of a login to the cloud print service 300. Alternatively, the information may be generated on the basis of authentication information stored in a setting information unit of the system of the computer 100 or in a setting information unit of the corresponding application of the computer 100. As information such as "terminal information" and "access destination", information regarding the computer 100 used to establish a connection to the cloud print service 300 is used. In normal cloud printing, a print session ends once printing has been performed, and thus it is not possible to specify the computer 100, which has commanded printing through the cloud print service 300, unless a printing management screen is separately called up using, for example, a browser. That is, after transmitting a print job, the computer 100 cannot obtain, from the cloud print service 300, information on details of print processing including the occurrence of an error. However, in this case, the use of this user identification information enables a notification target terminal such as the computer 100 to be specified from the cloud print service 300.

Thereafter, in processing in step 703, the computer 100 starts waiting for reception of a notification so as to be able to receive a notification from the cloud print service 300. Note that in a case where the computer 100 waits for reception of a notification using the structure of the OS or a service and also where the computer 100 receives a notification of information using a browser function, processing such as "launching the browser, through which a login session has been established, and causing the browser to be in the standby state" may be performed.

After generating the job and the user identification information, the computer 100, which is a client, collects and transmits these pieces of information to the cloud print service 300 (704).

The cloud print service 300 having received the print job extracts data of print content from the received print job and converts the extracted data into data that can be interpreted by the printer 200, which is the target printer (705). In this case, the cloud print service 300 returns a response to the request of the print job (706). Next, the cloud print service 300 having received the print job acquires, from attribute parameter information regarding the print job, information for specifying client information regarding a notification destination such as "group information", "terminal information", and "access destination" corresponding to "extended attribute (management information)" in FIG. 9. The acquired information is stored in the storage unit 302 of the cloud print service 300 in association with job information such as a job ID (job identification information for identifying the job) (707). The cloud print service 300 transmits the print job to the printer 200 and issues a print processing request (708). In this case, the terminal information or access destination corresponding to the transmission destination of the print job is switched to that of the printer 200, and the ID or state of the job is updated to the latest ID or state as needed. In a case where the format of the print content is a format that the printer 200 cannot receive, the format of the print content is converted into a format that the printer 200 can interpret.

The printer 200 having received the print processing request performs print processing (709). In a case where some kind of notification event has occurred in this processing (710), the printer 200 issues a notification of information to the cloud print service 300. The notification event that may occur in this processing corresponds to, for example, an error that has occurred at the time of printing. In a case where a notification event has occurred, the printer 200 acquires the above-described information regarding "extended attribute (notification information)" in FIG. 9, and issues a notification of the information to the cloud print service 300 (711). The notification in this case is made as a response to the print request from the cloud print service 300. Note that the cloud print service 300 holds the print job until printing is completed or canceled after the start of print processing (709). When a completion notification is received, the print job on the cloud print service 300 is deleted.

The cloud print service 300 having received the notification of the information notifies the computer 100, which is a client, of the received information (712). In this case, the notification destination is determined on the basis of information stored in the printer 200, the information regarding "notification range" and "notification destination" (information indicating that "a notification is to be issued to user01" because of "user" corresponding to "notification range" and "user01" corresponding to "notification destination"). Note that a physical notification-destination device such as the computer 100 is specified by comparing the information with the information in FIG. 4. Note that, in this case, when the printer 200 does not support the extended attributes, the cloud print service 300 may perform the following processing in accordance with predetermined rules. That is, information regarding "extended attribute (notification information)" may be stored on the basis of error information regarding the print job or information obtained by separately performing original communication processing.

The computer 100 displays the screen notification 501 on the basis of the last information received by the computer 100 (713).

By performing the processing described above, the notification information at the time of execution of the cloud print service is displayed.

The case where a notification event occurring in the printer 200 is an error at the time of printing has been described as an example; however, as supplementary information, even when printing is normally completed, in a case where there is information of which the printer 200 wants to notify the user such as "the toner or paper is running short", the information may be treated as a notification event.

Exemplary Embodiment 2

In the first exemplary embodiment, notification of, for example, an error occurring in the printer 200 at the time of printing in the cloud print service 300 has been described; however, there may be a case where the cloud print service 300 needs to issue a notification of some information. For example, in the first exemplary embodiment, the cloud print service 300 has simply commanded the printer 200 to perform printing without changing the print settings and the like in the print job. However, there may be a case where the cloud print service 300 supports more advanced print settings or a case where the cloud print service 300 has additional printing services. In such a case, the cloud print service 300 has additional print settings due to additional functions, and thus the existing settings of the print job may conflict with the additional print settings. Even when the cloud print service 300 does not have additional functions, there may be a case where the cloud print service 300 can make a more detailed verification of the print settings than the computer 100, which is a client having only standard functions. In such a case, the cloud print service 300 can expect occurrence of an error even before transmitting a print job to the printer 200, and thus the cloud print service 300 issues a notification of error information.

FIG. 12 is a sequence diagram in which a notification of an event that has occurred on the cloud print service 300 is issued. Note that the basic procedure such as job generation is substantially the same as that in the sequence in FIG. 7, and thus description will be omitted.

In a case where the cloud print service 300 having received the transmitted job (704) has an extended function that the print job does not have, the cloud print service 300 adds setting information regarding the extended function (1201). Note that, here, in a case where the user needs to specify additional settings, an application or a Web browser may be additionally launched to cause the user to set the settings.

Next, the cloud print service 300 performs validation processing (Validate) on the setting information regarding the job (1202). In this case, the cloud print service 300 may acquire data for additional validation by using an additional service or by communicating with the printer 200.

In a case where a result of the validation indicates occurrence of a problem, the cloud print service 300 issues a notification to the computer 100, which is a client (1203). The computer 100 having received the notification displays the screen notification 501 (1204). Note that, in this case, a setting screen for modifying the setting causing the problem may be displayed by clicking the screen notification 501.

By performing the processing described above, it becomes possible to issue a notification of an error detected on the cloud print service.

Exemplary Embodiment 3

In the first exemplary embodiment, the computer 100 receives, via the cloud print service 300, an error that has occurred in the printer 200 when printing is performed, and issues a notification of an error information. However, in the first exemplary embodiment, the computer 100 can receive a notification from the printer 200 only at a timing at which printing is performed.

In the present exemplary embodiment, processing will be described in which original setting items are added to the standard printing functions of the OS 1054 or in which status information on the printer is acquired on a print extensibility app for adding a notification function. In the present disclosure, this print extensibility app will be described assuming that the print extensibility app is basically stored as the device app 1052 of the computer 100 and is operated. However, the print extensibility app may be incorporated in the form of adding or overwriting a module of the general-purpose printer driver 1053 of the computer 100. Alternatively, the print extensibility app may be installed as the app 1051 and configured such that a function thereof is called up via the general-purpose printer driver 1053.

Figure 13A:
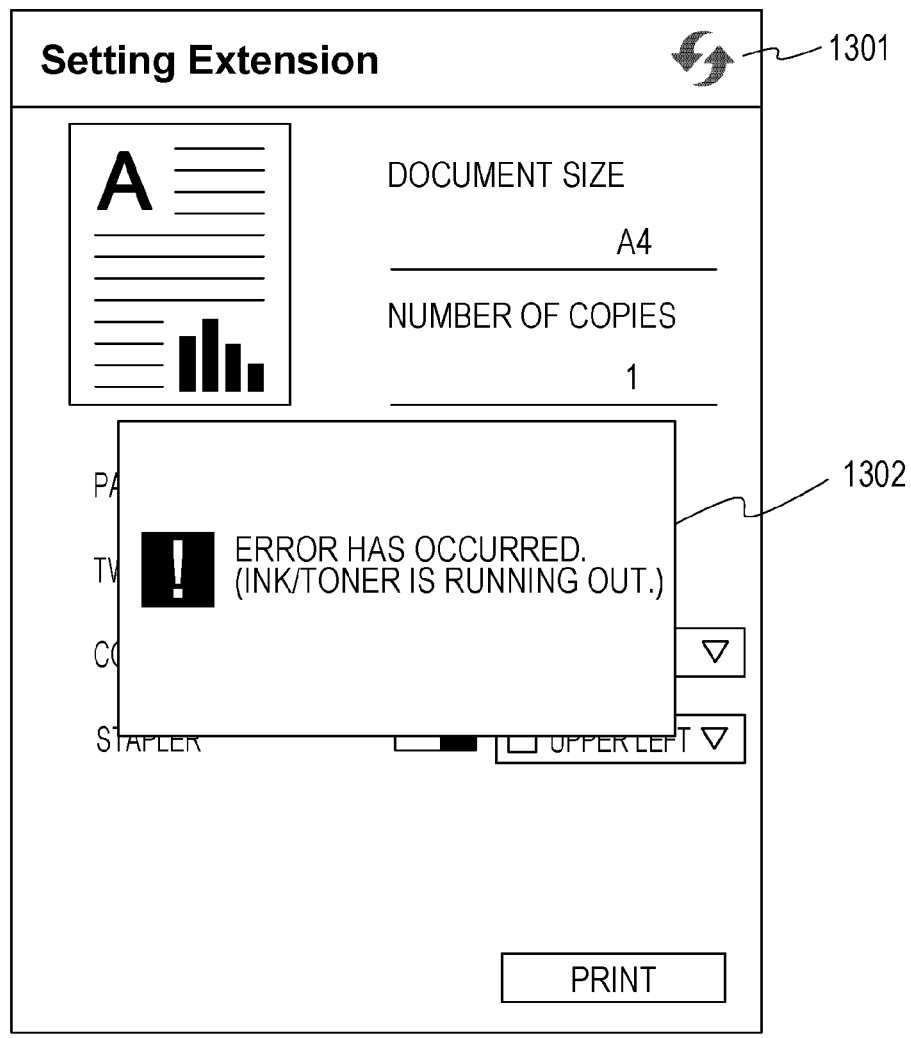
FIG. 13A illustrates an example in which printer status information is displayed using a print extensibility app.

Next, description will be made regarding an operation for acquiring the status of the printer 200 using the print extensibility app of the computer 100, the description being the outline of this case. First, the print extensibility app has a screen as in FIG. 13A or 13B and is called up by operating a button or a link such as "set detailed settings" at the time of printing. In order for the print extensibility app to acquire the status of the printer 200 after startup, first, an information acquisition button 1301 in FIG. 13A is pressed to acquire the status of the printer 200 via the cloud print service 300. The user is notified of the acquired information in the form of a modal window message or a toast notification called up by the print extensibility app as in a message 1302 in FIG. 13A or in the form of a displayed message 1303 on the screen of the print extensibility app in FIG. 13B. In a case where the setting screen is a web-based screen, a notification of the status may be issued in the form of page transition to a result display screen.

In the following, the overall processing will be described in detail using the sequence diagram in FIG. 14. First, a status information acquisition request such as pressing of the information acquisition button 1301 in FIG. 13A is accepted on the print extensibility app of the computer 100 (1401). In this case, a direct command from the user is taken as an example; however, a status information acquisition request may be called up at a predetermined timing determined by the print extensibility app. Examples of the predetermined timing include a timing when the print extensibility app is started up and a timing at which a predetermined time has elapsed. Alternatively, status information acquisition may be triggered by an event from outside the print extensibility app and performed. For example, this corresponds to a case where verification has not been performed at the cloud print service 300 at the time of startup of the print extensibility app and where status acquisition is performed at a timing at which a login to the system of the cloud print service 300 is successfully performed. Alternatively, status acquisition may be triggered by an event on the cloud print service 300 such as information update and performed.

When the information acquisition button 1301 is pressed, a status information acquisition request is transmitted (1402). In this case, a request to acquire the status information of the printer 200 that the cloud print service 300 has, such as "ready" or "stopped", is issued. Note that the cloud print service 300 simply performs standard printer status definition, and thus there may be a case where the cloud print service 300 cannot acquire detailed information that varies depending on the printer. Detailed information in this case is, for example, detailed information such as "red and blue toner is running out" when a standard status definition of the cloud print service 300 is "Ink/Toner Empty". Here, the case of issuing a request to acquire information including such detailed information is expected; however, in a case where the cloud print service 300 does not support detailed information acquisition implicitly, an additional parameter may be added to the information acquisition request or a special request to acquire detailed information may be transmitted.

The cloud print service 300 having received the information acquisition request transmits substantially the same request as the received information acquisition request to the printer 200 (1403). Note that in a case where the cloud print service 300 already has the status of the printer 200, the cloud print service 300 simply notifies the computer 100 of the status information (1406).

The printer 200 having received the information acquisition request generates status information. The status information in this case indicates, for example, information obtained by adding detailed status information 1502 to standard status information 1501 in FIG. 15. The standard status information 1501 indicates, for example, information generally recognized as common standards such as "Stopped" as a printer state, "Ink/Toner Empty" as a cause, and "Ink/Toner is running out." as detailed description in the case of toner information. The detailed status information 1502 indicates information that is not present in the standard status information 1501, the information including the percentages of remaining toner colors. Furthermore, the detailed status information 1502 may include details of information categorized into "Others" in accordance with the definitions of the standard status information 1501. In addition, in order to perform processing to satisfy the user's demand for causing the computer 100 to display all the statuses of the printer 200, the detailed status information 1502 may include statues that are not displayed (for example, problems such as "a paper jam has occurred" other than problems related to toner).

After generating the status information, the printer 200 notifies the cloud print service 300 of the generated status information (1405). The cloud print service 300 notifies the computer 100 of the received information (1406).

Figure 13B:
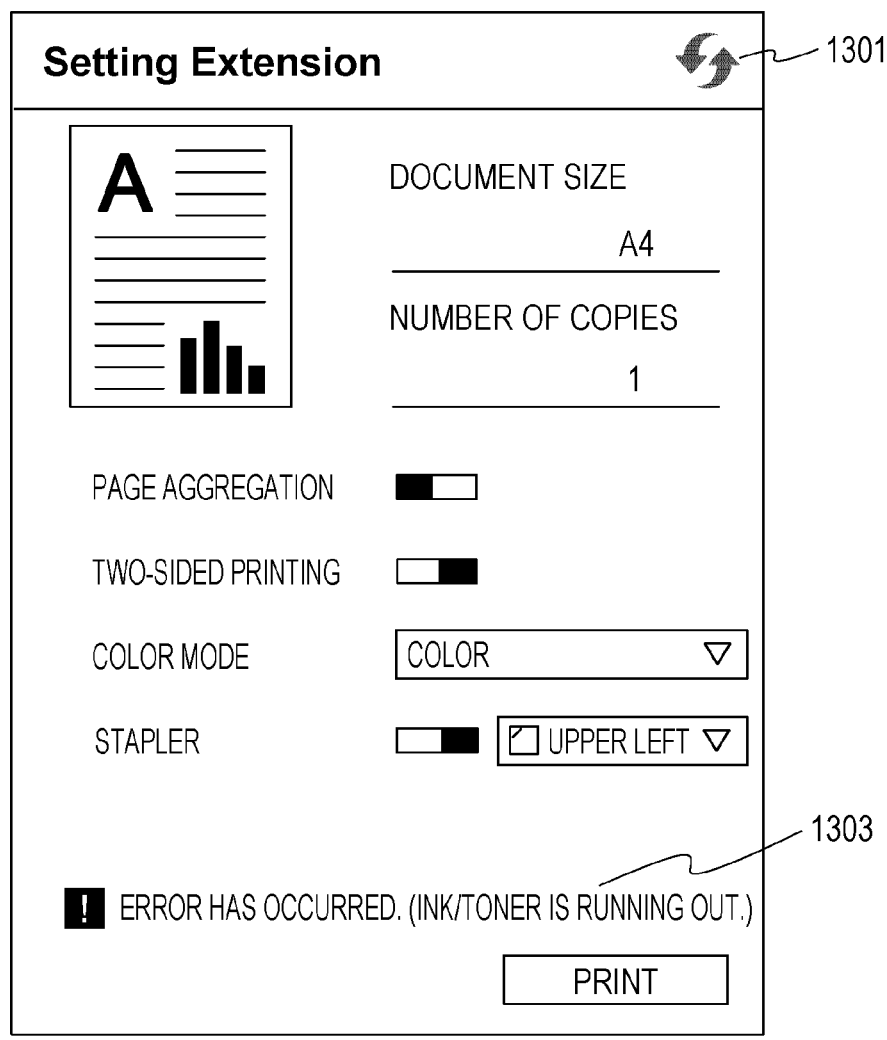
FIG. 13B illustrates an example in which the printer status information is displayed using the print extensibility app.

Lastly, the computer 100 displays the received information as in the form illustrated in FIG. 13A or 13B. In this case, for example, the print extensibility app may change the acquired information to "Red and Blue Toner Empty" by processing "Ink/Toner Empty" of the standard status information 1501 and "Remaining Red Toner Level: 0%" and "Remaining Blue Toner Level: 0%" of the detailed status information 1502.

By performing the processing described above, the print extensibility app displays the status information regarding the printer 200 registered in the cloud print service 300.

Processing in and after step 1408 is processing related to the present case and will thus be described as supplemental information. To begin with, in processing up to step 1407, a status information acquisition request has been issued from the computer 100 on the user side; however, in the present processing, processing in which a notification is transmitted from the printer will be described. The present processing is not very effective when status display is performed on a general setting screen, which is only temporarily opened at the time of printing. For the present processing, the expected cases are the case of having a system that runs in the background and displays a message upon receiving a notification and the case of having a function for continuously performing status monitoring. Note that, as a premise of the present processing, assume that a notification channel has been registered in advance by performing processing similarly to that illustrated in FIG. 6 such that the print extensibility app can receive an event from the outside. In addition, as a matter of course, notification channel information may be installed in the print extensibility app.

The processing will be specifically described in the following. First, when a change in the state of the device is detected such as the occurrence of an error in the printer 200 or the reboot of the printer 200 (1408), status information is generated as in processing in step 1404 (1409).

Thereafter, the printer 200 notifies the cloud print service 300 of the information (1410). The cloud print service 300 having been notified of the information notifies the computer 100 of the information (1411).

The print extensibility app of the computer 100 having lastly been notified of the information displays the notification information (1412).

By performing the processing described above, it becomes possible to display status information on the print extensibility app of the computer 100 in accordance with the occurrence of a status update event of the printer 200.

In the processing described above, the status information regarding the printer 200 is acquired from the cloud print service 300; however, there may be a case where status information cannot be acquired due to, for example, the reason that the printer 200 does not support status information communication in a communication method determined by the cloud print service 300. Thus, in FIG. 16, processing will be described in which the print extensibility app of the computer 100 acquires status information by directly communicating with the printer 200.

First, the print extensibility app of the computer 100 issues, to the cloud print service 300, a request to acquire information including communication destination information for communicating with the printer 200 such as the IP address, URI, or device name of the printer 200 (1601).

The cloud print service 300 having received the request transmits information regarding the printer 200 to the computer 100 (1602).

The print extensibility app having acquired the printer information acquires information necessary to communicate with the printer from the printer information (1603) and issues a request to acquire status information to the printer 200 on the basis of the information (1604).

The printer 200 having received the request to acquire status information generates the status information (1605).

Figure 14:
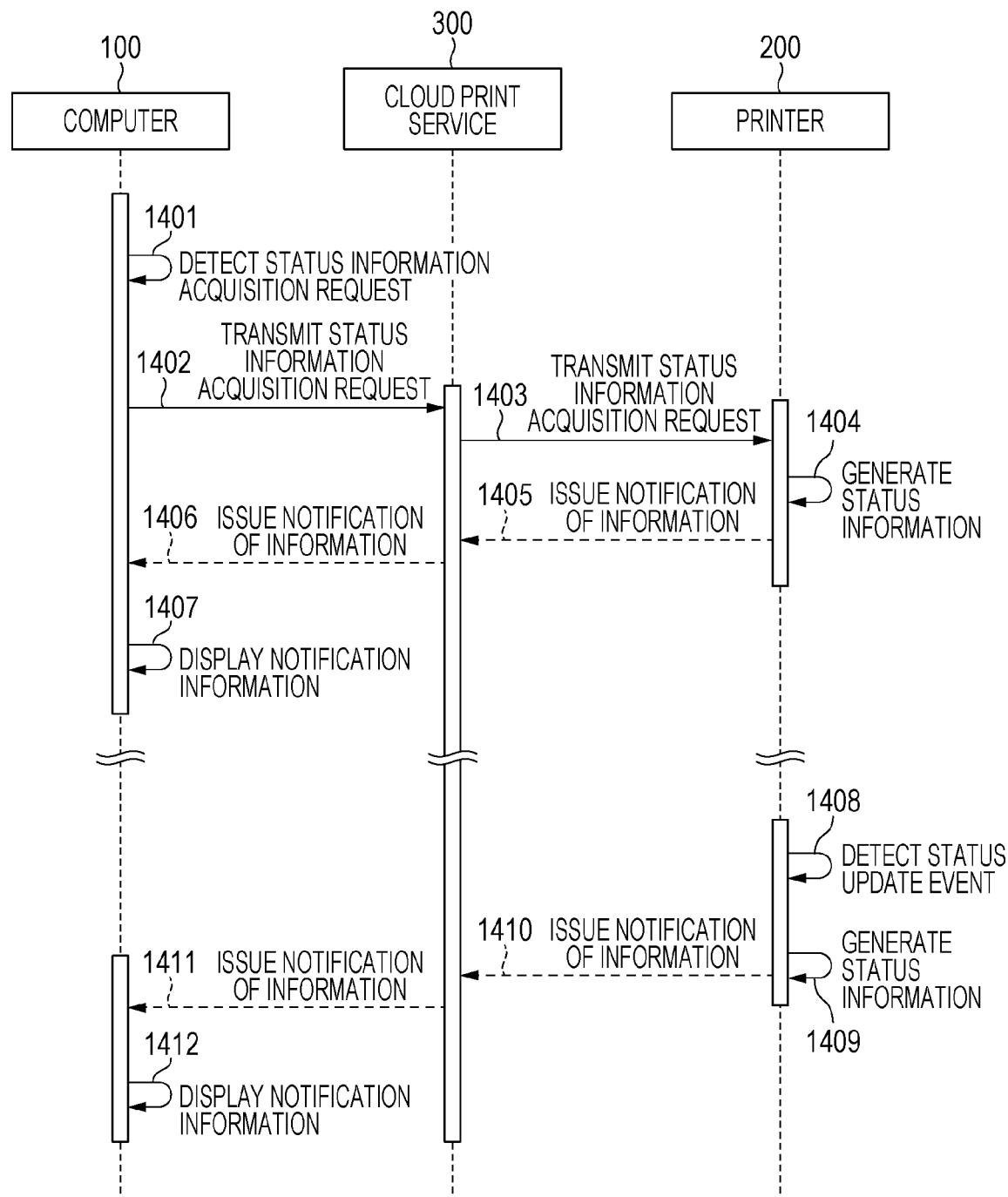
FIG. 14 is a sequence diagram for acquiring the printer status information from the print extensibility app and displaying the status information.

The processing in step 1605 is substantially the same as that in step 1404 of FIG. 14, and thus details will be omitted.

Thereafter, the printer 200 transmits the generated status information to the computer 100 (1606). Note that the data transmitted in this case may be data based on the standards unique to the vendor, which is not the data described herein.

Lastly, the print extensibility app having acquired the status information displays the notification information by performing substantially the same processing as that in step 1407 in FIG. 14 (1607).

By performing the processing described above, it becomes possible for the print extensibility app to directly communicate with the printer 200 and to display the status information regarding the printer 200.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus transmitting print data to a server system that transmits first information relating a printing apparatus as a response to a first request and storing a print setting application, the information processing apparatus comprising:
   a controller configured to:
      cause, by executing the print setting application, the information processing apparatus to transmit, to the server system, a second request relating the printing apparatus;
      receive, from the server system, the first information and second information as a response to the second request, wherein the second information is not received as a response to the first request; and
      cause a display of the information processing apparatus to display information based on the received first information and the received second information.

2. The information processing apparatus according to claim 1, wherein the second information is more detail than the first information.

3. The information processing apparatus according to claim 1, wherein the second request includes the first request and one or more parameters.

4. The information processing apparatus according to claim 1, wherein the first information is information indicating that a recording material is out and the second information is information indicating color of the recording material.

5. The information processing apparatus according to claim 1, wherein the server system obtains the second information from the printing apparatus in response to the second request transmitted from the information processing apparatus.

6. The information processing apparatus according to claim 5, wherein the printing apparatus transmits the second information to the server system.

7. The information processing apparatus according to claim 1, wherein the second request is transmitted to the server system according to a user operation received via a screen provided by the print setting application.

8. The information processing apparatus according to claim 1, wherein the print setting application extends a general-purpose printer function provided by an operating system of the information processing apparatus.

9. A control method for an information processing apparatus transmitting print data to a server system that transmits first information relating a printing apparatus as a response to a first request and storing a print setting application, the control method performed by executing the print setting application, the control method comprising:
   causing the information processing apparatus to transmit, to the server system, a second request relating the printing apparatus;
   receiving, from the server system, the first information and second information as a response to the second request, wherein the second information is not received as a response to the first request; and
   causing a display of the information processing apparatus to display information based on the received first information and the received second information.

10. The control method according to claim 9, wherein the second information is more detail than the first information.

11. The control method according to claim 9, wherein the second request includes the first request and one or more parameters.

12. The control method according to claim 9, wherein the first information is information indicating that a recording material is out and the second information is information indicating color of the recording material.

13. The control method according to claim 9, wherein the server system obtains the second information from the printing apparatus in response to the second request transmitted from the information processing apparatus.

14. The control method according to claim 13, wherein the printing apparatus transmits the second information to the server system.

15. The control method according claim 9, wherein the second request is transmitted to the server system according to a user operation received via a screen provided by the print setting application.

16. The control method according to claim 9, wherein the first information is information indicating that a recording material is out and the second information is information indicating a color of the recording material.

17. The control method according to claim 9, wherein the print setting application extends a general-purpose printer function provided by an operating system of the information processing apparatus.

18. A non-transitory computer readable storage medium storing a print setting application causing an information processing apparatus to transmit print data to a server system that transmits first information relating a printing apparatus as a response to a first request to execute a control method comprising:

causing the information processing apparatus to transmit, to the server system, a second request relating the printing apparatus;

receiving, from the server system, the first information and second information as a response to the second request, wherein the second information is not received as a response to the first request; and causing a display of the information processing apparatus to display information based on the received first information and the received second information transmitting, to the server system, print data that is to be printed by the printing apparatus.

19. The non-transitory computer readable storage medium according to claim 18, wherein the second information is more detailed than the first information.

20. The non-transitory computer readable storage medium according to claim 18, wherein the second request includes the first request and one or more parameters.

21. The non-transitory computer readable storage medium according to claim 18, wherein the second request is transmitted to the server system according to a user operation received via a screen provided by the print setting application.

22. The non-transitory computer readable storage medium according to claim 18, wherein the first information is information indicating that a recording material is out and the second information is information indicating a color of the recording material.

23. The non-transitory computer readable storage medium according to claim 18, wherein the print setting application extends a general-purpose printer function provided by an operating system of the information processing apparatus.

\* \* \* \* \*